(12) United States Patent
Florendo et al.

(10) Patent No.: US 9,558,216 B2
(45) Date of Patent: Jan. 31, 2017

(54) MOVING TABLES ACROSS NODES IN AN IN-MEMORY DATABASE INSTANCE

(71) Applicants: Colin Florendo, Marlborough, MA (US); Ivan Schreter, Malsch (DE)

(72) Inventors: Colin Florendo, Marlborough, MA (US); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 14/549,806

(22) Filed: Nov. 21, 2014

(65) Prior Publication Data

US 2016/0147748 A1 May 26, 2016

(51) Int. Cl.
*G06F 17/30* (2006.01)

(52) U.S. Cl.
CPC ....... *G06F 17/303* (2013.01); *G06F 17/30339* (2013.01); *G06F 17/30958* (2013.01)

(58) Field of Classification Search
None
See application file for complete search history.

(56) References Cited

U.S. PATENT DOCUMENTS

| | | | |
|---|---|---|---|
| 7,284,096 B2 | 10/2007 | Schreter | |
| 7,386,702 B2 | 6/2008 | Schreter | |
| 7,464,100 B2 | 12/2008 | Schreter | |
| 7,565,365 B2 | 7/2009 | Schreter | |
| 7,698,712 B2 | 4/2010 | Schreter | |
| 7,788,644 B2 | 8/2010 | Koduru et al. | |
| 7,809,891 B2 | 10/2010 | Schreter | |
| 7,831,554 B2 | 11/2010 | Schreter et al. | |
| 8,103,772 B2 | 1/2012 | Schreter | |
| 8,112,607 B2 | 2/2012 | Schreter | |
| 8,171,229 B2 | 5/2012 | Schreter | |
| 8,412,887 B2 | 4/2013 | Schreter | |
| 8,499,078 B2 | 7/2013 | Schreter | |
| 8,549,041 B2 | 10/2013 | Thomsen et al. | |
| 8,555,023 B2 | 10/2013 | Schreter | |
| 8,566,808 B2 | 10/2013 | Schreter | |
| 8,572,130 B2 | 10/2013 | Schreter | |
| 8,615,632 B2 | 12/2013 | Thomsen et al. | |
| 8,615,639 B2 | 12/2013 | Schroeder et al. | |
| 8,650,583 B2 | 2/2014 | Schreter | |
| 8,694,796 B2 | 4/2014 | Thomsen et al. | |
| 8,732,139 B2 | 5/2014 | Schreter | |
| 8,768,891 B2 | 7/2014 | Schreter | |

(Continued)

*Primary Examiner* — Wilson Lee
(74) *Attorney, Agent, or Firm* — Fish & Richardson P.C.

(57) ABSTRACT

The present disclosure involves systems, software, and computer implemented methods for moving a table from a source node to a destination node. In one example, the method includes receiving metadata associated with an in-memory database table stored at a source node. A table container is created responsive to receiving the metadata. The destination node sequentially requests, from the source node, portions of the table, wherein the table is serialized at the source node to provide a serialized sequence of table portions. Sequentially requesting comprises sending a request for a next portion of the table after processing a received portion, which includes receiving a portion of the serialized table, deserializing the received portion, adding the deserialized portion to the created table container, and in response to an end of file indication associated with the received portion, ending the requests and finalizing the table.

20 Claims, 4 Drawing Sheets

(56) References Cited

U.S. PATENT DOCUMENTS

| | | |
|---|---|---|
| 8,793,464 B2 | 7/2014 | Schreter et al. |
| 8,806,016 B2 | 8/2014 | Schreter |
| 8,819,074 B2 | 8/2014 | Schreter |
| 8,843,708 B2 | 9/2014 | Thomsen et al. |
| 2004/0043696 A1* | 3/2004 | Suzuki ............... A63H 3/28 446/268 |
| 2006/0064425 A1* | 3/2006 | Kakivaya .......... G06F 17/30595 |
| 2007/0239774 A1* | 10/2007 | Bodily ................ G06F 17/303 |
| 2008/0098018 A1* | 4/2008 | King ................ G06F 17/30961 |
| 2008/0151753 A1* | 6/2008 | Wynne ................. H04L 49/90 370/235 |
| 2008/0250203 A1 | 10/2008 | Schreter |
| 2010/0161569 A1 | 6/2010 | Schreter |
| 2010/0287346 A1 | 11/2010 | Schreter |
| 2012/0059808 A1* | 3/2012 | Neumann ......... G06F 17/30356 707/704 |
| 2013/0117221 A1 | 5/2013 | Thomsen et al. |
| 2013/0117233 A1 | 5/2013 | Schreter |
| 2013/0117234 A1 | 5/2013 | Schreter |
| 2013/0117235 A1 | 5/2013 | Schreter |
| 2013/0117236 A1 | 5/2013 | Schreter |
| 2013/0117237 A1 | 5/2013 | Thomsen et al. |
| 2013/0117241 A1 | 5/2013 | Schreter |
| 2013/0117247 A1 | 5/2013 | Schreter et al. |
| 2013/0117331 A1 | 5/2013 | Schreter et al. |
| 2013/0117522 A1 | 5/2013 | Schreter |
| 2013/0117528 A1 | 5/2013 | Thomsen et al. |
| 2013/0159339 A1 | 6/2013 | Thomsen et al. |
| 2013/0318254 A1 | 11/2013 | Schreter |
| 2013/0339312 A1 | 12/2013 | Schreter |
| 2014/0025651 A1 | 1/2014 | Schreter |
| 2014/0040590 A1 | 2/2014 | Schreter |
| 2014/0136473 A1 | 5/2014 | Faerber et al. |
| 2014/0279847 A1 | 9/2014 | Schreter et al. |
| 2014/0279961 A1 | 9/2014 | Schreter et al. |
| 2014/0279962 A1 | 9/2014 | Schreter et al. |
| 2014/0279963 A1 | 9/2014 | Schreter et al. |
| 2014/0281212 A1 | 9/2014 | Schreter et al. |

\* cited by examiner

MOVING TABLES ACROSS NODES IN AN IN-MEMORY DATABASE INSTANCE

TECHNICAL FIELD

The present disclosure relates to computer systems and computer-implemented methods for moving portions of a table in an in-memory database instance from a source node to a destination node.

A directed acyclic graph ("DAG") is a directed graph with no directed cycles. That is, it is formed by a collection of vertices and directed edges, each edge connecting one vertex to another, such that there is no way to start at some vertex v and follow a sequence of edges that eventually loops back to v again. DAGs can be used to represent a storage hierarchy of a table within a database.

In-memory databases are database management systems that rely on main memory for computer data storage. It is contrasted with database management systems that employ a disk storage mechanism. Main memory databases are faster than disk-optimized databases since the internal optimization algorithms are simpler and execute fewer CPU instructions. Accessing data in memory eliminates seek time when querying the data, which provides faster and more predictable performance than disk. In many cases, data within an in-memory database may be stored on one or more DAGs.

SUMMARY

The present disclosure involves systems, software, and computer-implemented methods for moving a table from a source node to a destination node. In one example, the method includes receiving, at a destination node, table metadata associated with a table of an in-memory database, located at a source node. A table container is created in response to receiving the table metadata. The destination node sequentially requests, from the source node, portions of the table, wherein the table is serialized at the source node to provide a serialized sequence of table portions, and wherein each request includes a sequence number, and wherein sequentially requesting comprises sending a request a next portion of the table including a next sequence number after processing a received portion including a sequence number immediately preceding the current sequence number. Processing the received portion includes receiving a requested portion of the serialized table at the destination node, deserializing the received portion of the serialized table at the destination node, adding the deserialized portion to the created table container in order based on the sequence number associated with the received portion, and in response to determining an end of file indication is associated with the received portion, ending the requesting of portions of the table and finalizing the table based on the received portions.

While generally described as computer-implemented software embodied on non-transitory, tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
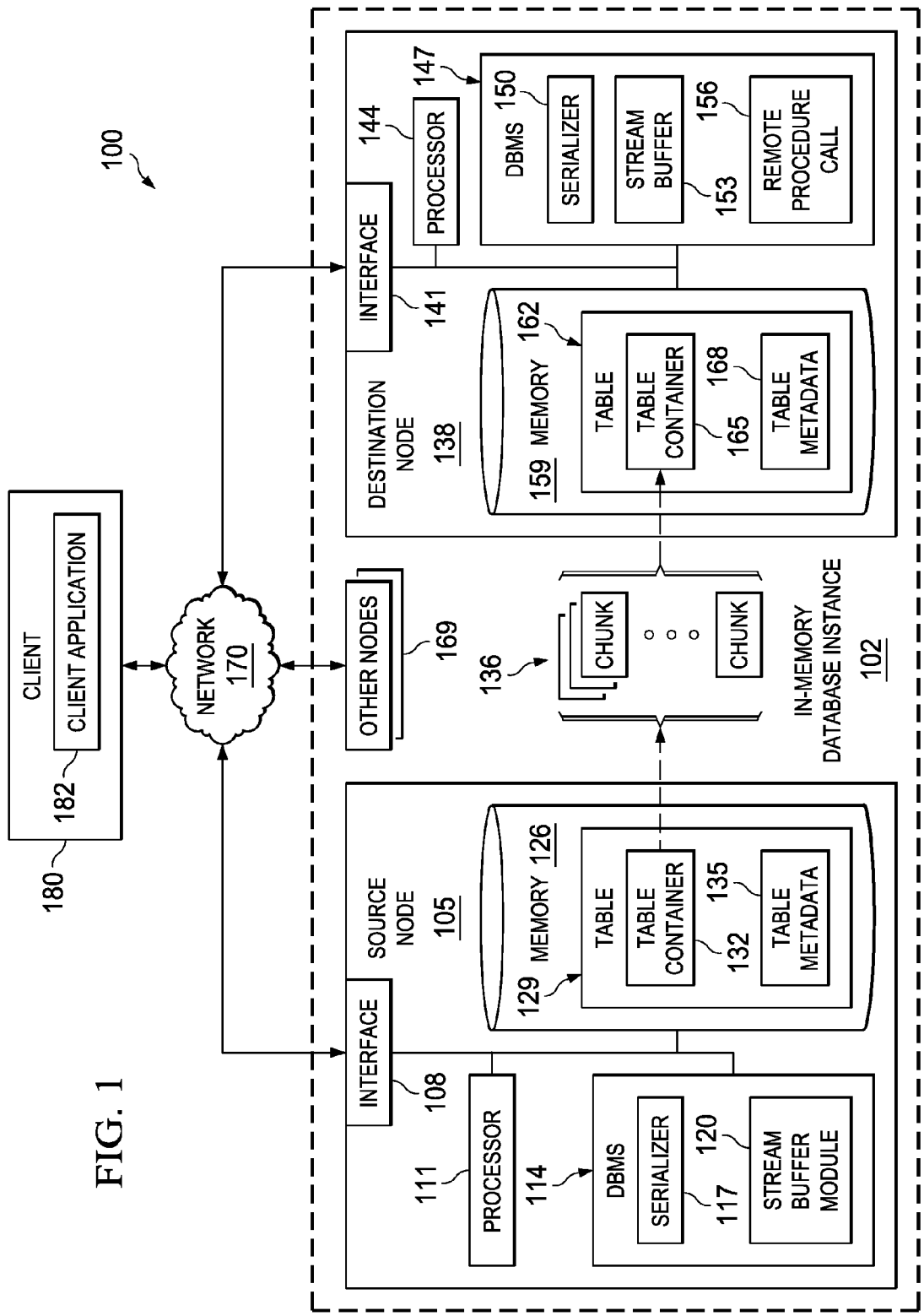
FIG. 1 is a block diagram illustrating an example system for moving portions of a table in an in-memory database instance from a source node to a destination node.

The present disclosure describes a system and methodology for moving a table from one node (i.e., "a source node") to another (i.e., "a destination node). The full move operation is a three-step process, wherein metadata associated with the table is moved to the new location where a proxy table container is created on the destination node. The data from the table on the source node is then moved to the destination. Upon completion of the move, the table container from the source node can be removed. The present disclosure focuses on a technique and system for the physical move of the table from the source node to the destination node.

A table container is represented in memory as a DAG and can be indexed on a disk using a container directory. Due to the file structure, the table cannot be transferred with simple byte streaming over a network protocol. To achieve serialization for the network transfer, existing functionality can be used in a new manner through enhancement and modification. Specifically, existing file import and export mechanisms can be used to successfully serialize the table persistence to ensure correctness post-move. For in-memory databases, the table may be an extremely large persistence. For that reason, it may be advantageous to avoid materializing a serialized representation on the source node unnecessarily. To do so, and to allow full and correct transmission of the table, a protocol has been developed to allow the import and export mechanism to write into a stream buffer instead of a file, and to transfer the serialized data buffer by buffer from the source node to the destination node over the network.

The DBMS stores some parts of a table in a common page-based persistence container (the "table persistence" or "table container"). Table metadata and, in some instances, virtual files storing data associated with a table, may be stored outside of the table container. In general, these parts are persisted in a single table container, including main storage, delta storage, multi-version concurrency control (MVCC) information, and persisted indexes. The persisted structures of a table are stored in chains of linked pages in the DAG format.

One goal of the table container is to support very big tables that do not fit into standard memory. To obtain maximum performance, in-memory databases may keep as much data in main memory as possible. However, with very big tables, this is not possible, or even desirable from a resource utilization point of view. Large tables can be loaded into memory only partially, and only by loading and unloading parts of the table. The units loaded into memory may need to be big enough to achieve sufficient compression and to enable fast in-memory column operations. However, the parts need to be small enough to fit into memory. In addition, it needs to be ensured that any delta merge operations are also efficient for big tables.

The general design for the table container data transfer between the source node and the destination node is described herein. The data transfer for the table container, which can contain, e.g., delta fragments and optionally paged main fragments, is performed at the first access of the partially moved table (i.e., after the metadata has been moved to the destination node). The data move is accomplished by establishing an internode data stream between a table container export on the source node and a table container import on the destination node. A stream buffer interface is provided to the source and destination nodes, which presents an input and an output stream to the table import and table export providers while internally providing a buffered data transfer over remote procedure calls (RPCs) from source to destination nodes. The table container transfer may be the movement of a table container that represents a portion of a larger table spread across a plurality of nodes (e.g., a partitioned table). In other instances, the table container transfer may be the movement of a single table container holding an entire table, such that the table and table container can be stored on a single node (e.g., an unpartitioned table). Portions of the description may describe either a partitioned or an unpartitioned example. However, it should be understood that the techniques and operations described herein could be used for either type of table.

The destination, or import, context can start via a call to the proxy table container on the destination node. A remote procedure call sent by the destination node can trigger the transfer of the table container. The data transfer will be in the form of serialized chunks of data, which are produced by the export context. The serialized chunks of data are then consumed by a series of remoteRead RPC calls from the destination node to the source node, which in turn fills a stream buffer with the data chunk and provides those data chunks to the import stream. In one implementation, the destination context is single-threaded, using the same thread as the job which accesses the table container. The implementation can be optionally optimized by spawning a parallel job to manage the data transfer from the source node while the main thread consumes the data and performs the import.

The source, or export, context can include a transient structure which is created on the source node at the request of the first remoteRead RPC from the destination node. The transient structure can include an execution thread which hooks to an output stream of the stream buffer interface and performs the export. The export thread can survive, along with the transient structure, after the initial RPC returns until either the data transfer completes or the source table container is unloaded.

The data transfer is driven from the destination node. The destination context requests one chunk of data at a time using a fixed buffer, e.g., of size BUFFERSIZE=10 MB. Each request can be labeled with a sequence number. The source context starts producing chunks at the first request (i.e., sequence 0) and checks that the requested chunk matches with a local sequence number of the produced chunk. In the event the destination context aborts and restarts, the destination context will detect a sequence mismatch and either restart the export from the beginning (e.g., where the sequence number requested is 0), or abort and return an error status (e.g., where the sequence number requested is greater than an expected one). In some instances, it may be possible to restart the export job and skip to a given sequence number.

When the export job writes the last chunk, an end of file (EOF) flag in the export context (or another suitable indication of the end of the file) is set and the job will be complete. When the next chunk request comes in and consumes the final chunk, the export context from the source node can be cleaned. When the last chunk request receives the final chunk, the EOF flag is propagated back to the import context, where the stream is notified of the completed transfer. In the event that the chunk request from the destination node returns with an error (e.g., container not found, node down, etc.), an exception can be thrown to terminate the import and data move operation on the destination node.

The destination-driven design of the solution allows for delayed movement of the data. Specifically, the move operation can be completed from the user's point of view before the data is moved. The data can then actually be moved at a later time, either asynchronously or on demand when table access occurs or is attempted at the destination node.

Turning to the illustrated embodiment, FIG. 1 is a block diagram illustrating an example system 100 for moving portions of a table in an in-memory database instance from a source node to a destination node. As illustrated in FIG. 1, system 100 is a client-server system capable of executing a distributed and multi-node in-memory database instance 102. Specifically, system 100 includes or is communicably coupled with a client 180, a source node 105, a destination node 138, one or more other nodes 169, and network 170. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, source node 105 may be any computer or processing device such as, for example, a blade server, general-purpose personal computer (PC), Mac®, workstation, UNIX-based workstation, or any other suitable device. Moreover, although FIG. 1 illustrates a source node 105 as a single system, source node 105 can be implemented using two or more systems, as well as computers other than servers, including a server pool. In other words, the present disclosure contemplates computers other than general-purpose computers, as well as computers without conventional operating systems. Further, illustrated source node 105, destination node 138, other nodes 169, and client 180 may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the in-memory database instance 102 represents a plurality of nodes in which fragments, or portions, of a large table may be stored. The in-memory database instance 102 represents the collection of nodes in which a particular in-memory database or set of databases may be stored, and may refer to one or a plurality of systems, servers, computers, and devices, either physical or virtual.

As illustrated, the in-memory database instance 102 includes a plurality of nodes, including the source node 105, destination node 138, and optionally, one or more other nodes 169. In the illustrated example, a table stored at the source node 105 (i.e., table 129) is to be moved to the destination node 138 (i.e., table 162). In the in-memory database instance 102, each node may be a completely separate computer or system (whether physically or virtually), with each system holding a portion of the in-memory database to provide significant scaling capabilities. Each node in the database can comprise and/or store a portion of an overall table spread across a plurality of nodes. Alternatively, in an unpartitioned example, a particular node can store an entire table without the table being stored on additional nodes. To move a particular table from one node to another, a move command is needed to perform the necessary shifting of the table, e.g., from the source node 105 to the destination node 138. Such a command may be initiated, for example, by a client application 182 at client 180, as well as by a particular application executing on or associated with one of the nodes.

In the present example, the source node 105 is the original location of a particular table (i.e., table 129), which is to be moved to the destination node 138 via the processes described herein. The source and destinations nodes 105, 138 may include similar or different components. As illustrated, the source node 105 includes an interface 108, a processor 111, a database management system (DBMS) 114 (which includes serializer 117 and stream buffer 120), and memory 126. In general, the source and destination nodes 105, 138 are simplified representations of one or more systems and/or servers that provide the described functionality, and is not meant to be limiting, but rather an example of the systems possible.

The interface 108 is used by the source node 105 for communicating with other systems in a distributed environment—including within the environment 100—connected to the network 170, e.g., other nodes within the in-memory database instance 102 such as the destination node 138 or the one or more other nodes 169, client 180, and other systems communicably coupled to the network 170. Generally, the interface 108 comprises logic encoded in software and/or hardware in a suitable combination and operable to communicate with the network 170. More specifically, the interface 108 may comprise software supporting one or more communication protocols associated with communications such that the network 170 or interface's hardware is operable to communicate physical signals within and outside of the illustrated environment 100.

Network 170 facilitates wireless or wireline communications between the components of the environment 100 (i.e., between the various nodes, between particular nodes and client 180, and among others), as well as with any other local or remote computer, such as additional clients, servers, or other devices communicably coupled to network 170, including those not illustrated in FIG. 1. In the illustrated environment, the network 170 is depicted as a single network, but may be comprised of more than one network without departing from the scope of this disclosure, so long as at least a portion of the network 170 may facilitate communications between senders and recipients. In some instances, one or more of the illustrated components may be included within network 170 as one or more cloud-based services or operations. The network 170 may be all or a portion of an enterprise or secured network, while in another instance, at least a portion of the network 170 may represent a connection to the Internet. In some instances, a portion of the network 170 may be a virtual private network (VPN). Further, all or a portion of the network 170 can comprise either a wireline or wireless link. Example wireless links may include 802.11a/b/g/n, 802.20, WiMax, LTE, and/or any other appropriate wireless link. In other words, the network 170 encompasses any internal or external network, networks, sub-network, or combination thereof operable to facilitate communications between various computing components inside and outside the illustrated environment 100. The network 170 may communicate, for example, Internet Protocol (IP) packets, Frame Relay frames, Asynchronous Transfer Mode (ATM) cells, voice, video, data, and other suitable information between network addresses. The network 170 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the source node 105 includes a processor 111. Although illustrated as a single processor 111 in FIG. 1, two or more processors may be used according to particular needs, desires, or particular implementations of the environment 100. Each processor 111 may be a central processing unit (CPU), an application-specific integrated circuit (ASIC), a field-programmable gate array (FPGA), or another suitable component. Generally, the processor 111 executes instructions and manipulates data to perform the operations of the source node 105. Specifically, the processor 111 executes the algorithms and operations described in the illustrated figures, including the operations performing the functionality associated with the source node 105 generally, as well as the various software modules (e.g., the DBMS 114, etc.), including the functionality for sending communications to and receiving transmissions from client 180 and other nodes 138, 169 within the in-memory database instance 102.

The illustrated source node 105 includes memory 126. The memory 126 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including databases, financial data, user information, administrative settings, password information, caches, applications, backup data, repositories storing business and/or dynamic information, and any other appropriate information including any parameters, variables, algorithms, instructions, rules, constraints, or references thereto associated with the purposes of the source node 105. Additionally, the memory 126 may store any other appropriate data, such as VPN applications, firmware logs and policies, firewall policies, a security or access log, print or other reporting files, as well as others. For example, memory 126 can store portions of the in-memory database instance 102 within the table 129 and its table container 132 and table metadata 135. The table container 132, as described above, can in some instances store the data of a fragment of a larger table stored across multiple nodes in the multi-nodal in-memory database instance 102 or, alternatively, can store data defining an individual table that is stored within a single node. The table container 132, and the other portions of the in-memory database instance 102, can be stored in main memory (e.g., RAM) for computer data storage. While the table container 132 is stored in main memory, some or a portion of the other information stored in memory 126 may be stored elsewhere. In addition to the table container 132, memory 126 includes, within the table 129, a set of table metadata 135 that describes the table 129 stored in memory 126. Table container 132 represents a data storage abstraction provided by the persistence layer and is implemented as collections of pages, although this can be hidden from the caller of the container interface. Containers may be used internally by the persistence layer, where appropriate.

As illustrated, the source node 105 includes the DBMS 114. The DBMS 114 is a software application that can interact with users, other applications, and the database itself to retrieve, update, delete, and analyze data. DBMS 114, in particular, is an application specifically designed to manage and interact with an in-memory database such as the table container 132 stored at the source node 105. For example, the DBMS 114 may be able to interpret standard-based requests, such as Structured Query Language (SQL) commands, and perform the actions associated therewith upon the databases and tables with which it is associated (e.g., the table container 132). The DBMS 114 may be associated with one or more other applications, or may be a standalone application. In the illustrated example, the DBMS 114 may assist in moving the table container 132 from the source node 105 to the destination node 138 in response to a SQL move command. The DBMS 114 includes serializer 117 and stream buffer module 120, each providing additional functionality to the DBMS 114.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The serializer 117 of the DBMS 114 performs operations to serialize the contents of the table container 132 (stored as a DAG). By serializing the table container 132, the move operations can be performed in data chunks over the network. Serializer 117 can allow complex data such as querysets, model instances, and DAGs, among others, to be converted to datasets that can then be easily rendered into JSON, XML, or other content types. Serializer 117 can also provide deserialization, allowing serialized data to be converted back into complex types, after first validating the incoming data.

The output of serializing the data of the table container 132 is then fed into the stream buffer module 120, which can also be a part of the DBMS 114. The stream buffer module 120 provides a generic buffer interface that allows the serialized data from the table container 132 to be consumed by another node (using that node's remote procedure call 156) over the network. In the described examples, the stream buffer module 120 may be able to accept a fixed chunk of serialized table data. In response to a request from the destination node 138 (and in particular, its remote procedure call 156), the portion of the serialized in the stream buffer can be consumed and provided to the destination node. In one example, the stream buffer module 120 may have a fixed size of 10 bytes. Therefore, a serialized table may be fed into the stream buffer 120 10 bytes at a time. Each addition to the stream buffer 120 may be assigned a sequence number to ensure that the data is received in an ordered fashion, such that the serializer 150 at the destination node 138 can deserialize the received data chunks of the table 165 in the proper order.

As illustrated, a series of chunks 136, or portions of the data from table container 132, are sent from the source node 105 to the destination node 138. The process describing how the chucks 136 are transmitted from the source node 105 to the destination node 138 are described in FIGS. 2-4.

As described, the destination node 138 may be similar to or different in design to the source node 105. In the illustrated example, the destination node 138 includes similar aspects and components as the source node 105. The destination node 138 includes an interface 141, a processor 144, and a DBMS 147 (which includes serializer 150, stream buffer 153, and a remote procedure call (RPC) 156). The interface 141, processor 144, and DBMS 147 may be similar to or different from those described in the source node 105. The destination node 138 includes the RPC 156, where the RPC 156 is used to obtain the chunks 136 of the data from the table container 132. The RPC 156 can access the stream buffer 120 of the source node 105 and retrieve or otherwise obtain the chunks 136 of the data within the table container 132. Those chunks 136 are placed into the stream buffer 153 at the destination node 138, where those chunks 136 are then provided to the serializer 150 for deserialization. Serializer 150 may be similar to serializer 117, and allows the serialized portions of the table data to be deserialized. The deserialized chunks 136 are then combined to form the table container 165, which is stored in memory 159 (which may be similar to or different than memory 126) in table container 162 along with table metadata 168. The table metadata 168 can be identical to, or include the information from, the table metadata 135, and can be provided to the destination node 138 in response to the move instruction. When the table metadata 135 is received, a proxy, or empty, table container 162 can be generated and prepared for the moved table data. In some instances, the receipt of the table metadata 168 and the generation of the table container 162 can occur before the movement of the table data and, in some instances, may trigger the RPC 156 used to initiate the move operations.

The RPC 156 is an inter-process communication that allows a computer program, here the DBMS 147, to cause a subroutine or procedure to execute in another address space (i.e., on the source node 105) without requiring explicitly coding for the details of the remote interaction. In the present example, the RPC 156 provides instructions to read table data from the stream buffer 120 and return that table data to the destination node 138 as chunk 136. Once the chunks 136 are provided to the stream buffer 153 and the serializer 150 (for deserialization), the table container 165 is recreated at the destination node 138. Each request can result in a new RPC instance, as each RPC itself only handles a single chunk 136. The series of RPC calls are controlled by the import context and stream buffer on the destination node 138. The series of RPC instances 156 can continue requesting and receiving chunks 136 of the data within the table container 132 until an end of file indication is received. In some instances, each chunk 136 may include a payload, a sequence number, and a field for an end of file indication of flag. If the end of file indication is included, no further RPC instances 156 requesting new chunks of the table container 132 and its table data are sent. In some instances, the series of RPC instances 156 can request for portions of the table container 132 in order, where each RPC instance 156 identifies a particular sequence number for retrieval. By requesting the table in a specific order, the serialization and deserialization operations can ensure that the table container 132 and its table data is recreated at the destination node 138 in the correct order. This is especially important where the data in the table container 132 is stored, for instance, as a DAG.

While in the present illustration the element labeled 105 is a source node while the element labeled 138 is a destination node 138, the roles of the nodes, as well as the other nodes 169, may be changed in alternative operations. In other words, a request to move table 162 to the source node 105 may be received, such that a reverse process is performed. The various nodes are each capable of performing the move operations in either direction and may include any necessary components for doing so.

Other nodes 169 comprise one or more nodes within the in-memory database instance 102 where further portions of the multi-nodal database are stored. The other nodes 169 may be similar to or different than either the source or destination nodes 105, 138. In further examples, a move command may be performed moving tables from either the source node 105 or destination node 138 to one of the other nodes 169, as well as moving tables from a particular other node 169 to one of the source node 105 or the destination node 138.

In some instances, a master node within the in-memory database instance 102 may contain information identifying where particular tables and portions of tables exist within the in-memory database instance 102. For instance, requests to move a particular table may first be sent to the master node, which uses its stored information to determine which particular nodes hold the relevant table and to where the table is to be moved. The master node can then translate a request to move a particular table to the proper form to cause the source node 105 to move the table to the destination node 138. In some instances, either the source node 105 or the destination node 138 can be the master node.

Client 180 may be any computing device operable to connect to or communicate with the nodes of the in-memory database instance 102 via network 170, as well as the with the network 170 itself, using a wireline or wireless connection, and can include a desktop computer, a mobile device, a tablet, a server, or any other suitable computer device. In general, client 180 comprises an electronic computer device operable to receive, transmit, process, and store any appropriate data associated with the environment 100 of FIG. 1. In the illustrated example, client 180 may include a client application 182 capable of issuing requests that may trigger or cause movement of a table from the source node 105 to the destination node 138, as well as to request information from the tables included within the in-memory database instance 102. Prompts and other information associated with the move and the in-memory database instance 102 may be presented at the client 180, such as at a graphical user interface (GUI).

While portions of the software elements illustrated in FIG. 1 are shown as individual modules that implement the various features and functionality through various objects, methods, or other processes, the software may instead include a number of sub-modules, components, libraries, and such, as appropriate. Conversely, the features and functionality of various components can be combined into single components as appropriate.

Figure 2:
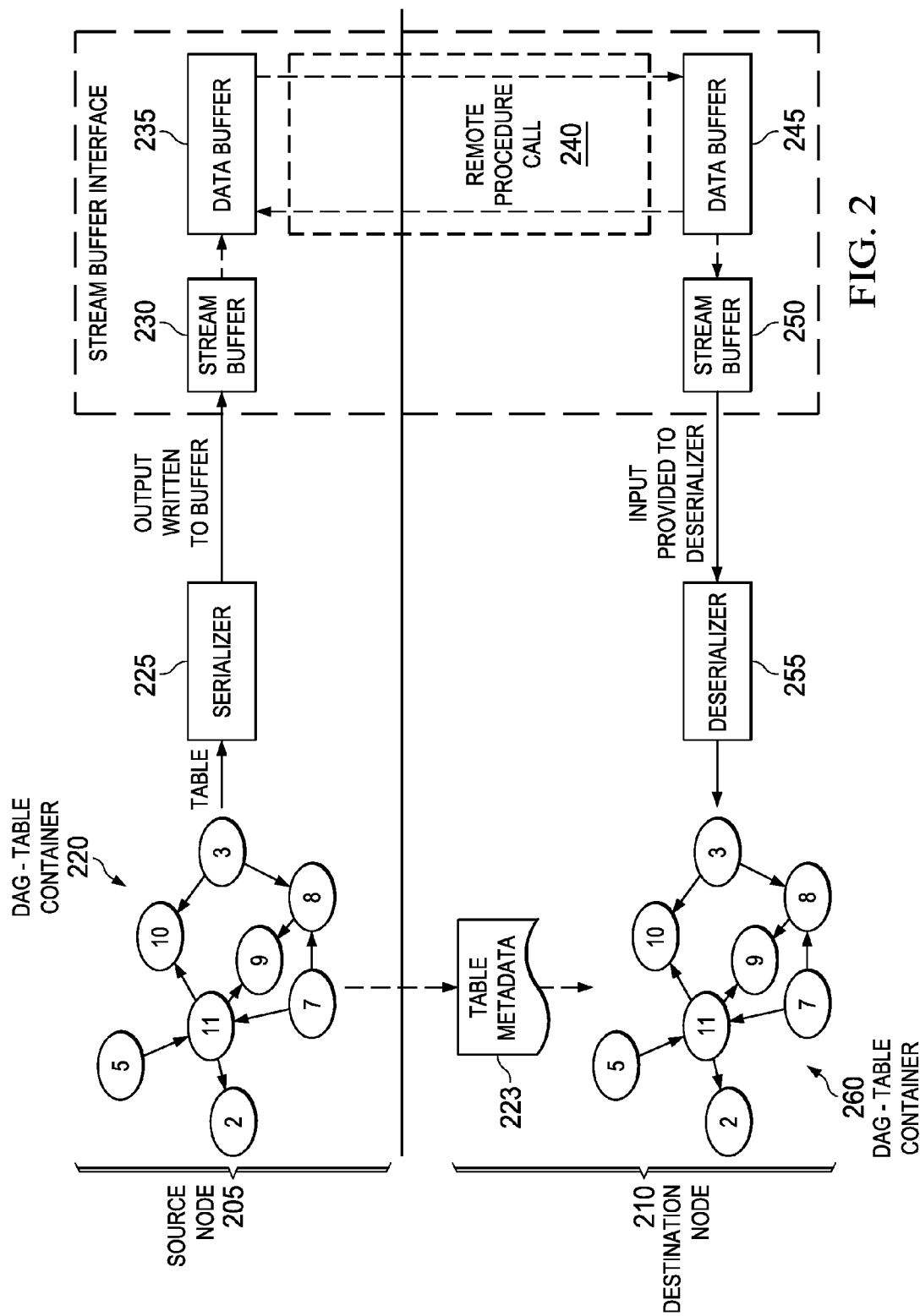
FIG. 2 is an illustration of example operations performed to move portions of a table in an in-memory database instance from a source node to a destination node.

FIG. 2 is an illustration of example operations performed to move portions of a table in an in-memory database instance from a source node to a destination node. The top of FIG. 2 illustrates operations at a source node 205, while the bottom of FIG. 2 illustrates operations at the destination node 210. FIG. 2 is meant as an example illustration. Alternative implementations, additional or fewer operations, and modifications to the illustration are understood to be within the scope of the present disclosure.

Initially, the source node includes a table container 220 storing table data represented as a directed acyclic graph (DAG). The table container 220 may be similar to table container 132 described above. Because of this, a direct transfer of the data within the table container 220 from the source node 205 to the destination node 210 is not possible. Initially, a set of table metadata 223 (stored apart from the table container 220 itself and describing the table data) is provided to the destination node 210. As a result, the table container 260 is created. As illustrated, portions of the table data are provided to a serializer 225, where the serializer 225 outputs a serialized version of the table data included within the table container 220. Portions of the serialized table data are provided to a stream buffer 230, where the stream buffer is of a fixed size (e.g., 10 bytes). The stream buffer 230 (or serializer 225) can assign, to each portion of the serialized table data, a particular sequence number beginning, for example, at 0. As portions are consumed, new portions are added to the stream buffer 230, each with the next sequence number in order. When those sequences are deserialized later and combined in the specified order, the move of table container 220 can be completed.

As illustrated, a series of remote procedure calls 240 from the destination node 210 are provided to request for the movement of the table including table container 220 to the destination node 210, as well as to perform the consumption of the serialized portions within the stream buffer 230. The remote procedure calls 240 can access the stream buffer 230 and consume the serialized portions (e.g., data buffer 235). The consumed data can be returned to the destination node 210 (e.g., data buffer 245) and placed into the input stream buffer 250. As the stream buffer 250 is filled, the corresponding data is sent to the deserializer 255, where the deserializer 255 performs operations to return the table data into the DAG format of table container 260.

In an example operation of the illustration actions, the first remote procedure call instance 240 can request sequence 0 of the serialized table data from the table container 220 in response to a request to move the table to destination node 210. In some instances, the request may be associated with the receipt of table metadata 223 associated with the table and its table container 220 at the destination node 210, along with information identifying the move request. In response to the request from the first remote procedure call instance 240, the source node 205 may begin serializing the table data and placing segments into the stream buffer 230. When sequence 0 is placed into the stream buffer 230, a first RPC procedure call 240 accesses the stream buffer 230 and returns the data buffer 235 associated with sequence 0 to the destination node 210. Sequence 0 can be placed into the stream buffer 250, which is then sent to the deserializer 255, where the deserialized data is reformed into the table container 260. The process can continue such that the next sequence number is requested by a new remote procedure call instance 240, and the remote procedure call instance 240 can access and return data chunk 1, similarly providing data chunk 1 to the stream buffer 250 and deserializer 255. Each RPC consumes a single sequence, and the process continues until all portions of table data within the table container 220 are provided and consumed by the series of remote procedure calls 240. In some instances, when the final portion of the table data is serialized, an end of file (EOF) flag or other indication can be set when the final data chunk is placed into the stream buffer 230. When the last remote procedure call instance 240 identifies the EOF flag, the remote procedure call instance 240 will return the data to the destination node 210 and ceases requesting additional sequences with another instance of the remote procedure call 240. After adding the final sequence to the table container 260, the destination node 210 can finalize the table container 260 and make the completed table available, such as by removing any locks applied during the move.

In some instances, the source node 205 can perform cleanup activities to remove any remnants of table container 220, including erasing or destroying any table information, data, or metadata associated with table container 220. Additionally, confirmation of the move may be reported to a master node, as appropriate, to ensure records on the new location of table container 260 and its table data are maintained and available.

Figure 3:
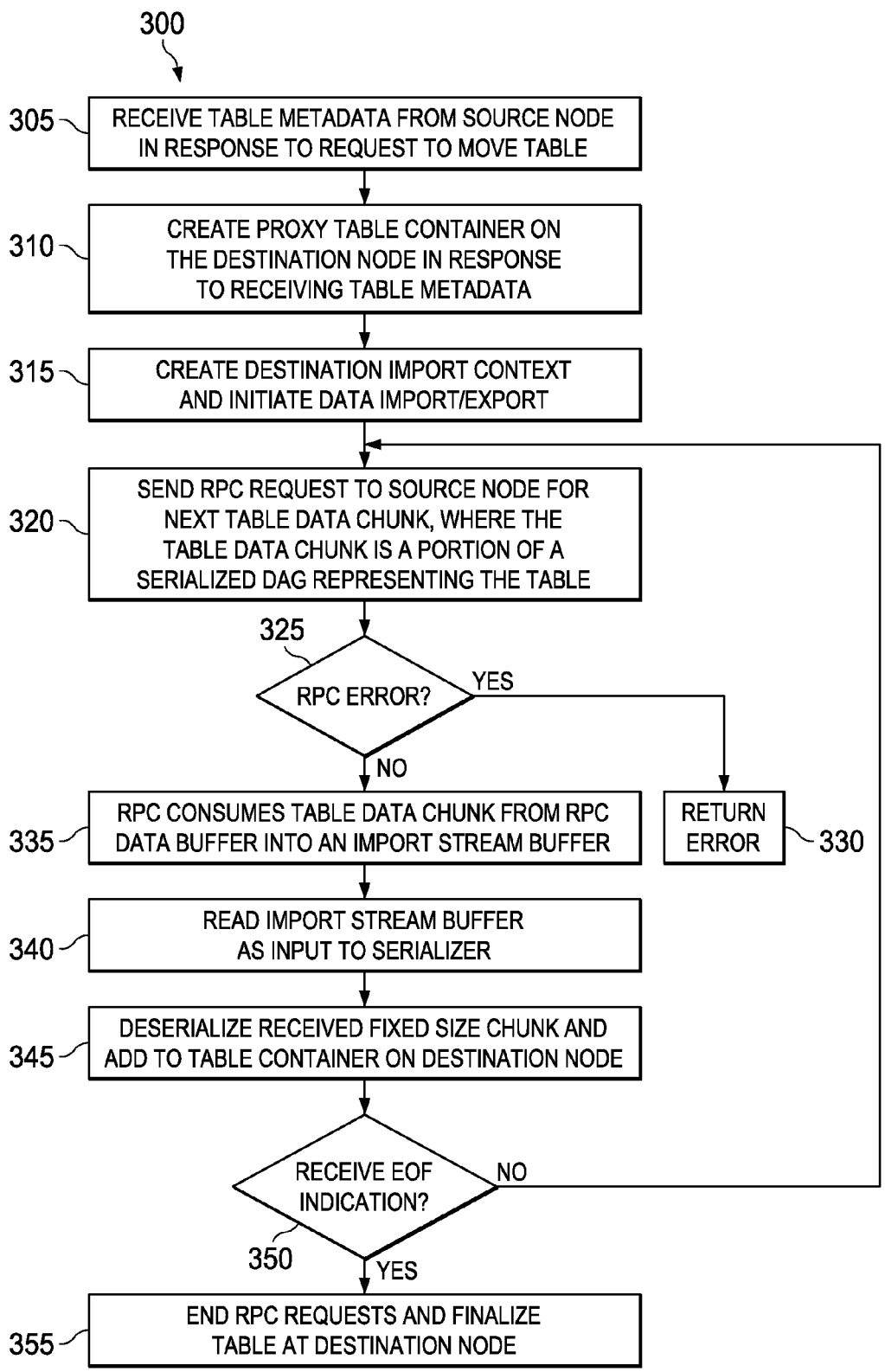
FIG. 3 is a flowchart of an example operation from the perspective of a destination node related to moving portions of a table in an in-memory database instance from a source node to a destination node.

FIG. 3 is a flowchart of an example operation 300 from the perspective of a destination node related to moving portions of a table in an in-memory database instance from a source node to a destination node. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, table metadata from the source node is received at the destination node. The table metadata can be sent by the source node in response to an initial move table request. Upon receiving the table metadata, the destination node creates a proxy, or empty, table container on the destination node at 310. The table container will be associated with the table metadata, and can be used to contain the incoming table.

At 315, the destination node creates an import context and initiates the data import from the source node. The import context can include an instantiation of one or more remote procedure calls to facilitate the move, as well as the preparation of a stream buffer at the destination node. Once prepared, the remote procedure call (or a new instance thereof) sends a request to the source node for the next portion of the table data to be moved at 320. The remote procedure call can correspond with the stream buffer of the source node. In some instances, the first request from the remote procedure call (or an instance thereof) of the destination node may trigger the serialization and stream buffer operations of the source node. The request from the remote procedure call is associated with a particular sequence number of the serialized table data, as the serialized table data is split into multiple pieces and added to the source node's stream buffer. Normally, unless the table data within the table container is small enough to fit into a small amount of data buffers, the stream buffer will only contain a small portion of the table data from the table container to avoid materializing the entire serialized representation in memory. In many instances, there is a limit to the size of the data buffer(s) in the stream buffer. In the present instances, a single data buffer associated with a sequence number may be included within the stream buffer. However, in alternative implementations, the stream buffer could be expanded to employ multiple data buffers. The remote procedure call can initially request a first sequence (e.g., sequence 0).

At 325, a determination is made as to whether the remote procedure call identifies an error. An error may occur when the sequence number associated with the portion of the table data in the source node's stream buffer does not match the requested sequence number. Other errors may also be possible. When an error is detected, method 300 moves to 330, where an error is returned and the import process ends. If, however, no error is determined, method 300 continues at 335, where the remote procedure call can consume the portion of the table data, or table data chunk, from an RFC data buffer. The remote procedure call can return the consumed portion of the table data into the import stream buffer at the destination node. The import stream buffer can be the same size as the export stream buffer, thereby allowing the full portion of the table data consumed from the export stream buffer at 335 to be placed into the import stream buffer. Alternatively, the import stream buffer may be bigger than the export stream buffer to allow additional chunks to be delivered to the destination node, such as when delays in deserializing the imported chunks slows the destination node.

At 340, the contents of the import stream buffer can be read into the serializer at the destination node, and at 345, the serializer can perform the deserialization operations for the particular sequence. The deserialization operations allow the previously serialized portion of the table data to be translated back into its original state—here, into the DAG format. Also at 345, the deserialized portions of the table data are added to the table container. As each of the deserialized portions are added in the proper sequence, the full table can be moved to the destination node.

After, during, or concurrently to the operations of 335 through 345, method 300 determines whether an end of file (EOF) indication is included in the current serialized sequence being processed at 350. If not, method 300 returns to 320, where a new request is sent from the remote procedure call (or an instance thereof) to obtain the next sequence of the serialized table data from the export stream buffer of the source node. If, however, the EOF indication is identified, method 300 moves to 355, where the series of remote procedure calls ends the requests and the table is finalized within the table container at the destination node.

Figure 4:
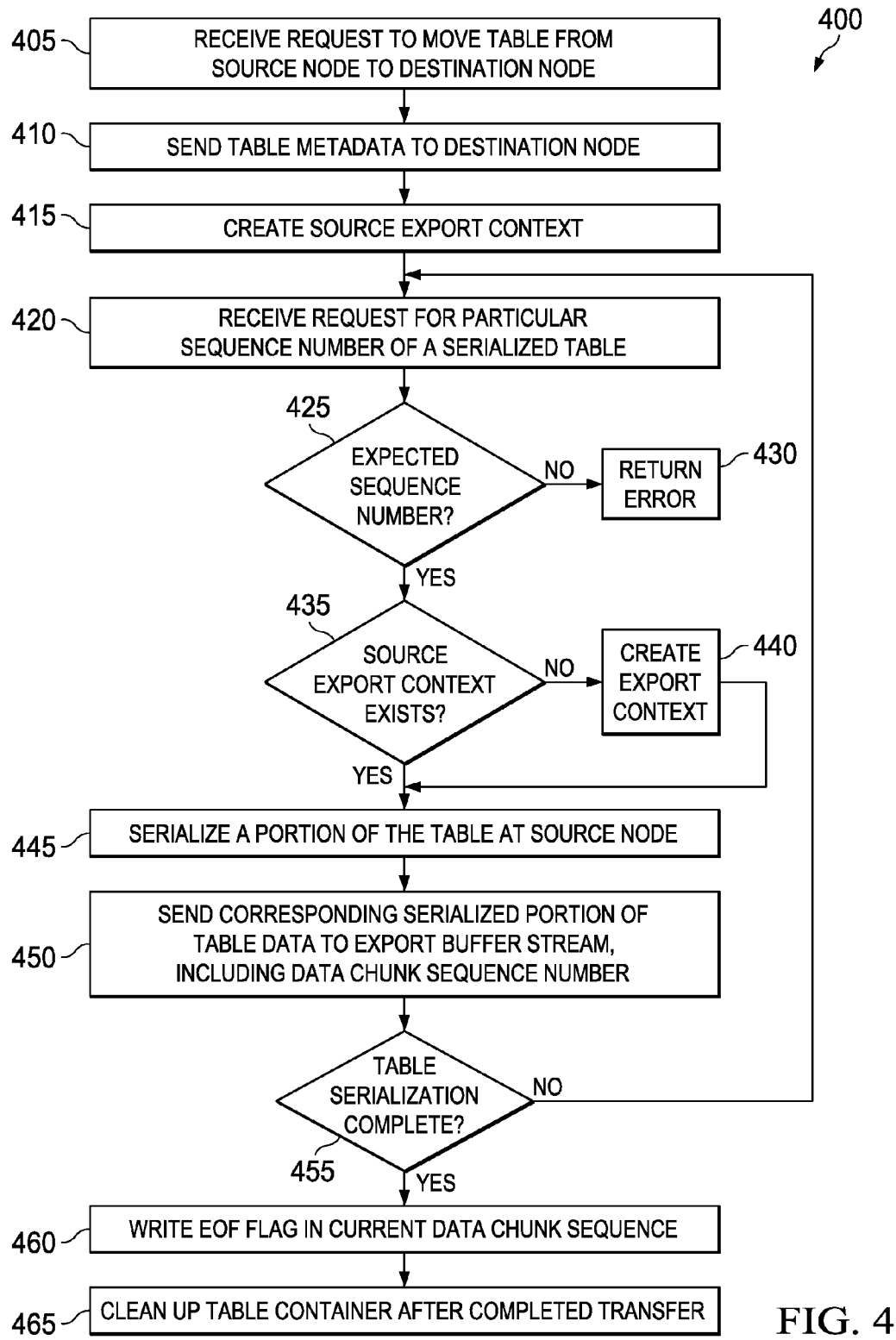
FIG. 4 is a flowchart of an example operation from the perspective of a source node related to moving portions of a table in an in-memory database instance from a source node to a destination node.

FIG. 4 is a flowchart of an example operation 400 from the perspective of a source node related to moving portions of a table in an in-memory database instance from a source node to a destination node. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate.

At 405, a request to move a table currently at the source node to the destination node is received. In some instances, the request may be received from a separate master node other than the source node itself within an in-memory database instance. In response to receiving the request, at 410, the source node can send a set of table metadata associated with the to-be moved table to the destination node associated with the request. The table metadata can be sent in any appropriate format and using any appropriate protocol.

At 415, a source node export context is created to perform the operations needed to move the table from the source node to the destination node. The export context may include the creation of an export stream buffer. In some instances, the source node export context is not created until a first remote procedure call is received. In those instances, the creation of the source export context may be delayed until after the first request, such as at 435 and 440 below.

At 420, a request from a remote procedure call of the destination node is received, where the request identifies a particular sequence number of a serialized set of table data from the table container. At 425, a determination is made as to whether the request was associated with an expected sequence number. For example, if the request was the first request and included a request for the first sequence (e.g., sequence 0), then the expected sequence would be received. If the prior request was for sequence 2 and the current request was for sequence 8, then the expected sequence would not be received. If the determination is made that the correct sequence number is requested, method 400 continues at 435. If, however, the determination is made that an incorrect sequence number is requested, then method 400 moves to 430 where an error is returned.

At 435, a determination is made as to whether a source export context exists. As described above with regard to 415, the source export context may not be created until the first request (i.e., remote procedure call) is received. If the creation of the source export context is delayed until the first request is received, then upon receiving the first request, a source export context is created at 440. During portions of the loop where the source export context exists, method 400 continues at 445.

At 445, at least a portion of the table data (which is stored as a DAG) from the table container is serialized. In some instances, the table data may be serialized at or in response to the source export context being created. In other instances, such as is illustrated here, only a portion of the table data may be serialized in response to the incoming request from the remote procedure call. In some instances, the entire table data within the table container may be serialized at once when the entire serialized representation fits into the fixed number of data buffers allocated by the export stream buffer. At 450, the serialized portion of the table data is sent to the fixed-size import stream buffer until the stream buffer is full. Once the stream buffer is full, the remote procedure call from the destination node consumes the data.

At 455, a determination is made as to whether the table serialization is complete. If the current serialized portion of the table data to be provided to the stream buffer is the last from the table container, then the table serialization is considered complete. If additional portions remain, then method 400 returns to 420 and awaits a request for the next sequence of the serialized table data. If, however, the table serialization is complete, at 460 the current data chunk written into the stream buffer can have its end of file flag or other indication set to provide the destination node and its remote procedure call with the information that the complete table has been provided.

At 465, once the table serialization is complete and the table move is completed, the source node can perform cleanup operations to remove any remaining portions or related content to the table. In some instances, the cleanup operations may not be executed until a confirmation of completion is received from the destination node. Waiting to perform cleanup of the source import context can be beneficial in cases where a transient network error may cause the failure of an RPC instance, after which the destination export context may re-try the RPC to get the currently requested sequence. The source cleanup may include two parts: 1) cleanup of the export context which happens as described here and 2) removal of the persistent table container from the source node. In case of a crash, the data will be maintained to guarantee that the data has been written to disk on the destination node or is still accessible on disk at the source node; otherwise, data loss can occur. By maintaining the data until the save point is reached, data recovery in the event of a crash is ensured. The removal of the persistent table container may only happen after a save point has occurred on the destination node ensuring that the table container has been written to disk and ensuring it is persisted.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computerized method performed by one or more processors, the method comprising:
   receiving, at a destination node, table metadata associated with a table of an in-memory database, the table located at a source node in a multi-node database instance;
   creating, at the destination node, a table container for the table in response to receiving the table metadata;
   sequentially requesting, from the source node, portions of the table, wherein the table is serialized at the source node to provide a serialized sequence of table portions, and wherein each request includes a sequence number, wherein sequentially requesting comprises sending a request for a next portion of the table including a next sequence number after processing a received portion including a sequence number immediately preceding the next sequence number, wherein processing the received portion includes:
      receiving a requested portion of the serialized table at the destination node;
      deserializing the received portion of the serialized table at the destination node;
      adding the deserialized portion to the created table container in order based on the sequence number associated with the received portion; and
      in response to determining an end of file indication is associated with the received portion, ending the requesting of portions of the table and finalizing the table based on the received portions.

2. The method of claim 1, wherein the table is stored as a directed acyclic graph (DAG).

3. The method of claim 1, wherein the table is a table fragment of a table existing across a plurality of nodes.

4. The method of claim 1, wherein the table metadata is received prior to movement of the table fragment from the source node to the destination node.

5. The method of claim 4, where the table metadata is received in response to a structured query language (SQL) request to move the table fragment from the source node to the destination node.

6. The method of claim 1, wherein the source node and the destination node comprise separate nodes within an in-memory database instance.

7. The method of claim 6, wherein the source node comprises a first computer system and the destination node comprises a different second computer system.

8. The method of claim 1, wherein a remote procedure call is used to request and receive portions of the table from the source node.

9. The method of claim 8, wherein the remote procedure call receives the portions of the table from the source node by accessing a data buffer at the source node, the data buffer storing a fixed size buffer storing a serialized portion of the table.

10. The method of claim 9, wherein the remote procedure call sends the portion of the table accessed from the data buffer at the source node to a serializer at the destination node, wherein the serializer at the destination node performs the deserialization operations.

11. The method of claim 1, wherein finalizing the table based on the received portions includes initiating a cleanup process on the source node, wherein the cleanup process confirm finalization of the table at the destination node and, in response to the finalization, removes the table on the source node.

12. The method of claim 1, wherein processing the received portion further includes:
 receiving a non-requested portion of the serialized table at the destination node, wherein the non-requested portion includes a sequence number other than the sequence number requested; and
 cancelling the requests for the portions of the table from the source node.

13. A non-transitory, computer-readable medium storing computer-readable instructions for moving a table from a source node to a destination node, the instructions executable by a computer and configured to:
 receive, at a destination node, table metadata associated with a table of an in-memory database, the table located at a source node in a multi-node database instance;
 create, at the destination node, a table container for the table in response to receiving the table metadata;
 sequentially request, from the source node, portions of the table, wherein the table is serialized at the source node to provide a serialized sequence of table portions, and wherein each request includes a sequence number, wherein sequentially requesting comprises sending a request for a next portion of the table including a next sequence number after processing a received portion including a sequence number immediately preceding the next sequence number, wherein processing the received portion includes:
 receiving a requested portion of the serialized table at the destination node;
 deserializing the received portion of the serialized table at the destination node;
 adding the deserialized portion to the created table container in order based on the sequence number associated with the received portion; and
 in response to determining an end of file indication is associated with the received portion, ending the requesting of portions of the table and finalizing the table based on the received portions.

14. The medium of claim 13, wherein the table is stored as a directed acyclic graph (DAG).

15. The medium of claim 13, wherein the table is a table fragment of a table existing across a plurality of nodes.

16. The medium of claim 13, wherein the table metadata is received prior to movement of the table from the source node to the destination node.

17. The medium of claim 13, wherein the source node and the destination node comprise separate nodes within an in-memory database instance, and wherein the source node comprises a first computer system and the destination node comprises a different second computer system.

18. The medium of claim 13, wherein a remote procedure call is used to request and receive portions of the table from the source node, and wherein the remote procedure call receives the portions of the table from the source node by accessing a data buffer at the source node, the data buffer storing a fixed size buffer storing a serialized portion of the table.

19. The medium of claim 18, wherein the remote procedure call sends the portion of the table accessed from the data buffer at the source node to a serializer at the destination node, wherein the serializer at the destination node performs the deserialization operations.

20. A system, comprising:
 a memory;
 at least one hardware processor interoperably coupled with the memory and configured to:
 receive, at a destination node, table metadata associated with a table of an in-memory database, the table located at a source node in a multi-node database instance;
 create, at the destination node, a table container for the table in response to receiving the table metadata;
 sequentially request, from the source node, portions of the table, wherein the table is serialized at the source node to provide a serialized sequence of table portions, and wherein each request includes a sequence number, wherein sequentially requesting comprises sending a request for a next portion of the table including a next sequence number after processing a received portion including a sequence number immediately preceding the next sequence number, wherein processing the received portion includes:
 receiving a requested portion of the serialized table at the destination node;
 deserializing the received portion of the serialized table at the destination node;
 adding the deserialized portion to the created table container in order based on the sequence number associated with the received portion; and
 in response to determining an end of file indication is associated with the received portion, ending the requesting of portions of the table and finalizing the table based on the received portions.

* * * * *